(12) United States Patent
Hutchins

(10) Patent No.: US 6,367,822 B1
(45) Date of Patent: Apr. 9, 2002

(54) BAG EXPANDER

(76) Inventor: William B. Hutchins, 224 Illinois, Park Forest, IL (US) 60466

(*) Notice: Subject to any disclaimer, the term of this patent is extended or adjusted under 35 U.S.C. 154(b) by 0 days.

(21) Appl. No.: 09/613,917

(22) Filed: Jul. 11, 2000

(51) Int. Cl.$^7$ .................................................. B62B 1/06
(52) U.S. Cl. ...................................... 280/47.24; 248/99
(58) Field of Search .......................... 280/47.24, 47.26; 248/99, 101, 97, 98; 24/30.5 R, 35.5, 545; 16/426

(56) References Cited

U.S. PATENT DOCUMENTS

| | | | |
|---|---|---|---|
| 895,759 A | * 8/1908 | Hulbert | |
| 3,627,243 A | 12/1971 | Farrelli | |
| 3,754,771 A | 8/1973 | Shagoury | |
| 3,893,699 A | 7/1975 | Morris | |
| 3,992,034 A | * 11/1976 | Smith, Sr. et al. | 280/654 |
| 4,124,185 A | 11/1978 | Preisinger | |
| 4,281,843 A | * 8/1981 | Johnson et al. | 280/47.26 |
| 4,358,083 A | * 11/1982 | Haubrich | 248/545 |
| 4,452,468 A | * 6/1984 | Eads et al. | 280/641 |
| 4,916,993 A | * 4/1990 | Siekawitch | 81/64 |
| 4,917,393 A | 4/1990 | Rogers | |
| 5,082,219 A | * 1/1992 | Blair | 248/99 |
| 5,209,517 A | 5/1993 | Shagoury | |
| 5,456,431 A | 10/1995 | Iinisky | |
| 5,899,419 A | * 5/1999 | Ross et al. | 248/97 |

* cited by examiner

Primary Examiner—Brian L. Johnson
Assistant Examiner—Tony Winner
(74) Attorney, Agent, or Firm—Don Moyer

(57) ABSTRACT

The bag expander comprises a bracket, and comprises a band, the band having a fixed end attached to the bracket, the band being flexed to form a perimeter, the band having a tail through the bracket and distal the perimeter, the band being held with the perimeter fixed by friction between the band and the bracket, and the tail being manually movable through the bracket to enlarge and reduce the perimeter; wherein the bracket is preferably connected to a wheeled cart.

5 Claims, 1 Drawing Sheet

BAG EXPANDER

BACKGROUND

The product has only one moving part which is manually adjusted to expand inside a bag mouth and hold the bag mouth open and is preferably attached to a cart.

Bag holders shown in prior art—for example in U.S. Pat. No. 3,627,243 by Farrelli, U.S. Pat. No. 3,754,771 by Shagoury, U.S. Pat. No. 3,893,699 by Morris, U.S. Pat. No. 3,992,034 by Smith, U.S. Pat. No. 4,124,185 by Preisinger, U.S. Pat. No. 4,917,393 by Rogers, U.S. Pat. No. 5,082,219 by Blair, U.S. Pat. No. 5,209,517 by Shagoury, and U.S. Pat. No. 5,456,431 by Ilnisky—do not suggest individually, nor in any combination, the one moving part bag expander shown here.

SUMMARY

The bag expander product comprises a bracket, the bracket having a bracket first surface and a bracket second surface, the bracket second surface being at a fixed distance from the bracket first surface; and comprises a band, the band having a fixed end attached to the bracket first surface, the band being flexed to form a perimeter, the band passing between the bracket first surface and the bracket second surface, the band having a tail through the bracket and distal the perimeter, the band being held with the perimeter fixed by friction between the band and the bracket second surface, and the tail being manually movable through the bracket to enlarge and reduce the perimeter; wherein the bracket is preferably connected to structures such as a cart which can be wheeled and can be a powered vehicle.

DRAWINGS

DESCRIPTION

All embodiments of the bag expander comprise a bracket and a band fixed to, and movable through, the bracket to form an adjustable perimeter.

The bracket has a bracket first surface 22 and a bracket second surface 24, with the bracket second surface being at a fixed distance from the bracket first surface. The band has a fixed end 12 attached to the bracket first surface. The band is flexed to form a perimeter with the band passing between the bracket first surface and the bracket second surface. The band has a tail 11 through the bracket and distal the perimeter. The band is held with the perimeter fixed by friction between 15 the band and the bracket second surface. The tail is manually movable through the bracket to enlarge and reduce 11A the perimeter.

The key to the preferred form of the invention is that the tail is distal the perimeter—meaning that the tail is biased to move, and does move, away from the perimeter—because it is this which provides band against bracket friction so that the perimeter is both manually adjustable and otherwise fixed. This also provides force securing a bag mouth.

Figure 1:
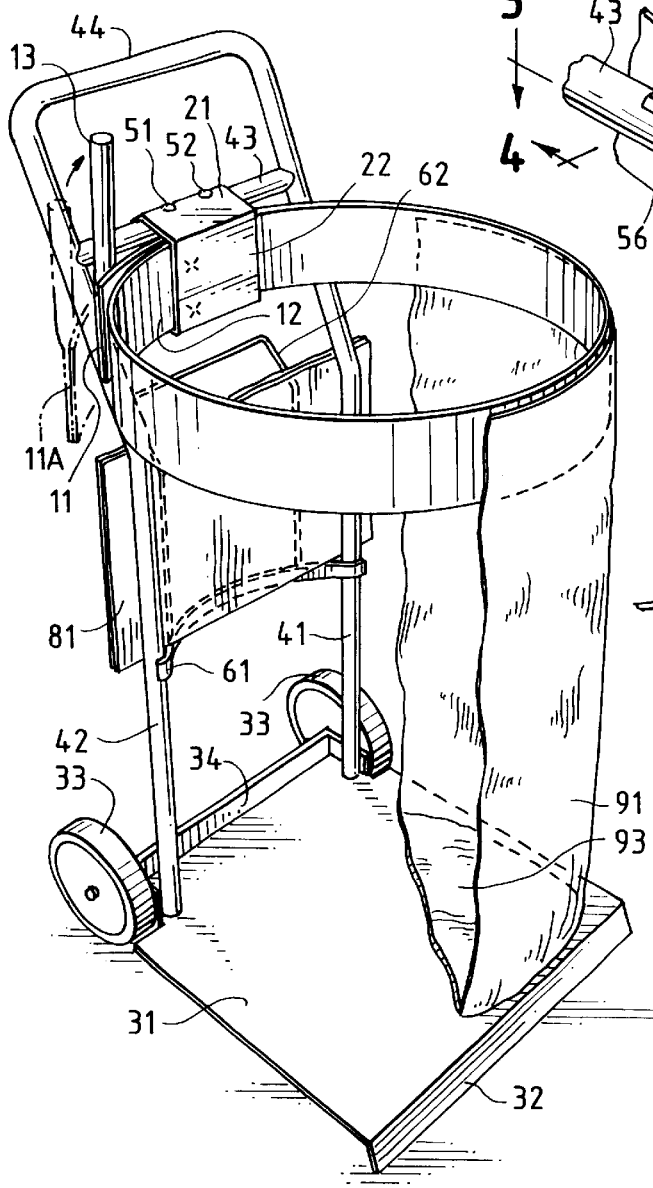
FIG. 1 depicts the bag expander on a cart and holding a bag.
Figure 2:
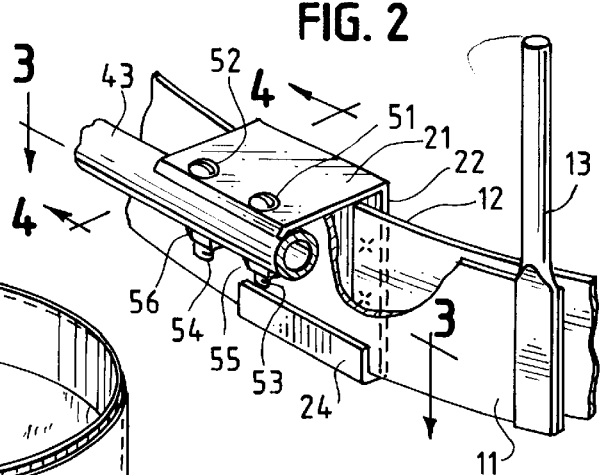
FIG. 2 depicts bracket and attachment details.
Figure 3:
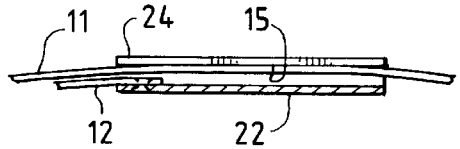
FIG. 3 depicts a view across line 3—3 in FIG. 2.
Figure 4:
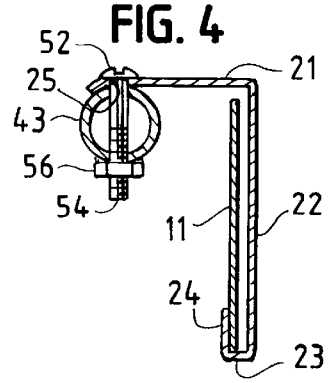
FIG. 4 depicts a view across line 4—4 in FIG. 2
Figure 5:
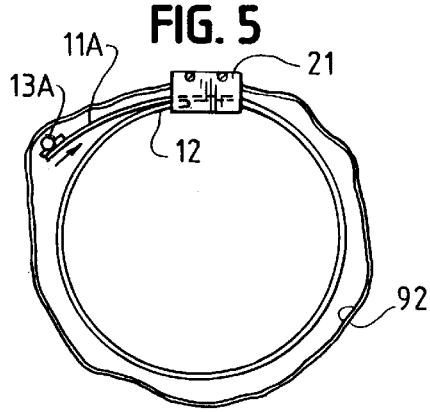
FIG. 5 depicts the bag expander with a reduced perimeter.
Figure 6:
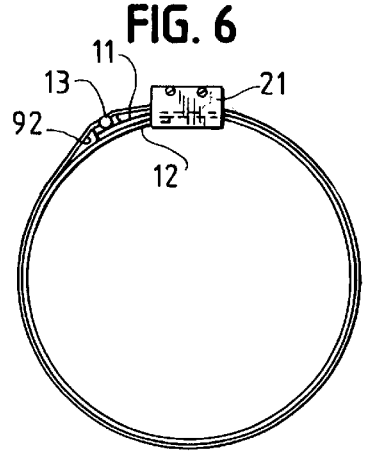
FIG. 6 depicts the bag expander with an enlarged perimeter.

Preferably there is a handle 13 attached to the tail. The handle is moved to enlarge and reduce 13A the perimeter as shown in FIG. 5 and FIG. 6. This expands the mouth 92 of a bag 91.

While there many ways to form a bracket to provide the first surface and the second surface, preferably the bracket is formed to a bracket top 21, a bracket front 22, a bracket bottom 23, and a bracket back 24. The bracket front and the bracket back provide the bracket first surface and the bracket second surface. The bracket bottom keeps the bracket second surface at a fixed distance from the bracket first surface. The bracket top helps keep the band in the bracket and provides means for attaching the bracket to various structures such as a fixed upright and a powered vehicle.

The bracket can be attached to various structures. Preferably the bracket is attached to a cart which can be a wheeled cart as shown, can be various carts known in the art, and can be a powered vehicle such as a lawn mower.

The preferred cart has a base 31—which can be solid as shown and can be open mesh—which supports the bag closed end 93. A first upright 41 and a second upright 42 are attached to the base and are joined distal the base to form a handle 44. A cross member 43 is attached to both uprights between the handle and the base. There is a base upward portion 34 to which wheels 33 are attached, and a base downward portion 32.

An optional spare bag holder comprises second cross member 61, which is attached to the uprights between the cross member 43 and the base, and which curves away from the base to form the bottom for an attached bow 62 which holds a spare bag 81.

Preferably the bracket top 21 has holes 25 for being attached to the cross member 43 (and thus to each upright 41, 42) preferably by tightening headed ends 51, 52 of threaded 53, 54 bolts against nuts 55, 56. The bracket could be attached to the cart—and to various other structures and devices—by various means known in the art.

Descriptions, drawings, and referenced elements illustrating principles of the invention do not limit the invention as other equivalent elements, element configurations, and operations comprehended by principles of the invention will be obvious hereafter to persons skilled in the art.

What is claimed is:

1. A product for holding a bag, the bag having an open end bounded by a bag periphery, the product comprising:

a structure;

a bracket, the bracket being attached to the structure so that the bracket does not move relative to the structure with forces of use;

a channel in the bracket; and a band, the band having a fixed end fixedly attached to the bracket, the band passing through the channel to form a band periphery, the band having a free end beyond the channel and beyond the periphery, the free end being moved toward the channel to enlarge the band periphery to match the bag periphery after the bag periphery encloses the band periphery, and the free end being biased to move away from the band periphery and exert force against the bag periphery after the bag periphery encloses the band periphery and the band periphery has been enlarged to match the bag periphery.

2. The product of claim 1 wherein the structure is a wheeled cart.

3. The product of claim 2 wherein the wheeled cart has a spare bag holder attached to the cart.

4. A product for holding a bag, the bag having an open end bounded by a bag periphery, the product comprising:
   a wheeled cart;
   a bracket,
   the bracket being attached to the cart so that the bracket does not move relative to the cart with forces of use;
   a channel in the bracket; and
   a band,
   the band having a fixed end fixedly attached to the bracket,
   the band passing through the bracket to form a band periphery,
   the band having a free end beyond the channel and beyond the periphery,
   the free end being moved toward the channel to enlarge the band periphery to match the bag periphery after the bag periphery encloses the band periphery, and
   the free end being biased to move away from the band periphery and exert force against the bag periphery to hold the bag after the bag periphery encloses the band periphery and the band periphery has been enlarged to match the bag periphery.

5. The product of claim 4 wherein the wheeled cart has a spare bag holder attached to the cart.

* * * * *